US009137199B2

(12) United States Patent
Palani (10) Patent No.: US 9,137,199 B2
(45) Date of Patent: Sep. 15, 2015

(54) STATEFUL NAT64 FUNCTION IN A DISTRIBUTED ARCHITECTURE

(75) Inventor: Kumara Venkatesh Palani, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 668 days.

(21) Appl. No.: 13/405,563

(22) Filed: Feb. 27, 2012

(65) Prior Publication Data

US 2013/0223445 A1    Aug. 29, 2013

(51) Int. Cl.
*H04L 29/12*     (2006.01)
(52) U.S. Cl.
CPC .............. *H04L 61/251* (2013.01); *H04L 61/255* (2013.01); *H04L 2212/0025* (2013.01)
(58) Field of Classification Search
None
See application file for complete search history.

(56) References Cited

U.S. PATENT DOCUMENTS

| | | | |
|---|---|---|---|
| 6,389,468 B1 | 5/2002 | Muller et al. | |
| 7,418,001 B2 | 8/2008 | Yun et al. | |
| 7,440,405 B2 | 10/2008 | Hsieh et al. | |
| 7,551,632 B2 | 6/2009 | Thubert et al. | |
| 2003/0031173 A1* | 2/2003 | Park et al. | 370/389 |
| 2011/0019677 A1 | 1/2011 | Townsley et al. | |
| 2011/0038377 A1 | 2/2011 | Haddad | |
| 2011/0211553 A1 | 9/2011 | Haddad | |

OTHER PUBLICATIONS

Despres, "IPv6 Rapid Deployment on IPv4 Infrastructure (6rd)", Internet Engineering Task Force (IETF) RFC 5569, Jan. 2010.*
Carpenter et al. "Connection of IPV6 Domains via IPv4 Clouds", Internet Engineering Task Force (IETF) RFC 3056, Feb. 2001.*
Bagnulo et al., "Stateful NAT64: Network Address and Protocol Translation from IPv6 clients to IPv4 Servers", Internet Engineering Task Force (IETF) RFC 6146, Apr. 2011.*
Bagnulo, et al., "DNS64: DNS Extensions for Network Address Translation from IPv6 Clients to IPv4 Servers", In Proceedings of Internet Engineering Task Force, Apr. 2011, 32 pages.

* cited by examiner

*Primary Examiner* — Joseph Bednash
(74) *Attorney, Agent, or Firm* — Sunah Lee; Kate Drakos; Micky Minhas (57) ABSTRACT

Various embodiments pertain to techniques for translation of network addresses including encapsulating state information into the data packet being transferred. A NAT device receives a data packet destined for an IPv4 server from an IPv6 client device and translates the destination address. The NAT device encapsulates the translation information into the data packet, and transmits the data packet to the IPv4 server. Upon receiving a response from the IPv4 server, the NAT device translates the source address on the data packet to reflect the original destination address for the packet received from the IPv6 client, such that the client device may be unaware that it was communicating with an IPv4 server. In various embodiments, the translation information is embedded in the IP options as part of the TCP header of the data packet.

22 Claims, 7 Drawing Sheets

STATEFUL NAT64 FUNCTION IN A DISTRIBUTED ARCHITECTURE

BACKGROUND

Each device connected to a network, such as the internet, is assigned a unique, numerical internet protocol (IP) address such as 98.76.543.210. To send data, such as a web page request, from one device to another, a data packet containing the IP addresses of both devices is transferred across the network. The underlying technology that makes connection of devices to the internet possible is Internet Protocol version 4 (IPv4). Because IPv4 uses 32-bit internet addresses, it can support roughly 4.29 billion IP addresses. To date, nearly all of these addresses have been assigned. Internet Protocol version 6 (IPv6), the successor to IPv4, functions similarly to IPv4 by providing unique, numerical IP addresses to enable devices to communicate via the internet. However, in contrast to IPv4, IPv6 utilizes 128-bit addresses, allowing it to support 2^128 IP addresses. The transition from IPv4 to IPv6 has been slow and only a fraction of the web has switched to the new protocol. With some devices running on IPv4 and some running on IPv6, which essentially run as parallel networks, exchanging data requires special gateways, such as a Network Address Translation (NAT) router.

When a packet received from an IPv6 device is destined for an IPv4 device, a NAT64 router translates the packet from the IPv6 network into the IPv4 network. The translation includes translation of the IPv6 address into an IPv4 address. Because the IPv6 address space is much larger than the IPv4 address space, one-to-one mapping is not possible, and the router is required to maintain a map of the addresses. In stateful NAT64 mapping, the address mapping (or state table) is created when the first packet from the IPv6 network reaches the NAT64 router to be translated. After the state table has been created, packets can flow between the networks. However, maintaining the state table utilizes space and memory on the device that could be used for other processes. In addition, the size of the state table is limited by the resources of the device, such as available memory.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments pertain to techniques for translation of network addresses including encapsulating state information into the data packet being transferred. A NAT device receives a data packet destined for an IPv4 server from an IPv6 client device and translates the destination address. The NAT device encapsulates the translation information into the data packet, and transmits the data packet to the IPv4 server. Upon receiving a response from the IPv4 server, the NAT device translates the source address on the data packet to reflect the original destination address for the packet received from the IPv6 client, such that the client device may be unaware that it was communicating with an IPv4 server. In various embodiments, the translation information is embedded in the IP options as part of the TCP header of the data packet.

In various embodiments, jumbo packets or jumbo frames are enabled between the NAT device and host server. Jumbo packets are data packets having an increased maximum segment size (MSS) (e.g., 1500 bits or more) when compared to the standard MSS utilized for transmission (e.g., 1460 bits). The increased MSS enables the original 128-bit IP address to be encapsulated as part of the header what would exceed the standard MSS.

BRIEF DESCRIPTION OF THE DRAWINGS

While the specification concludes with claims particularly pointing out and distinctly claiming the subject matter, it is believed that the embodiments will be better understood from the following description in conjunction with the accompanying figures, in which:

DETAILED DESCRIPTION

Overview

Various embodiments pertain to techniques for translation of network addresses including encapsulating state information into the data packet being transferred. A NAT device receives a data packet destined for an IPv4 server, or a device accessible via an IPv4 server, from an IPv6 client device and translates the destination address. The NAT device encapsulates the translation information into the data packet, and transmits the data packet to the IPv4 server. Upon receiving a response from the IPv4 server, the NAT device translates the source address on the data packet to reflect the original destination address for the packet received from the IPv6 client, such that the client device may be unaware that it was communicating with an IPv4 server. In various embodiments, the translation information is embedded in the IP options as part of the TCP header of the data packet.

In various embodiments, jumbo packets or jumbo frames are enabled between the NAT device and host server. Jumbo packets are data packets having an increased maximum segment size (MSS) (e.g., 1500 bits or more) when compared to the standard MSS utilized for transmission (e.g., 1460 bits). The increased MSS enables the original 128-bit IP address to be encapsulated as part of the header what would exceed the standard MSS.

In the discussion that follows, a section entitled "Example Operating Environment" describes an operating environment in accordance with one or more embodiments. Next, a section entitled "Example Embodiments" describes various example embodiments of translating of network addresses by including encapsulating state information into the data packet being transferred and various paths of transmission for a data packet through networks operated according to different protocols.

Finally, a section entitled "Example Device" describes an example device that can be used to implement one or more embodiments.

Consider, now, an example operating environment in accordance with one or more embodiments.

Example Operating Environment

Figure 1:
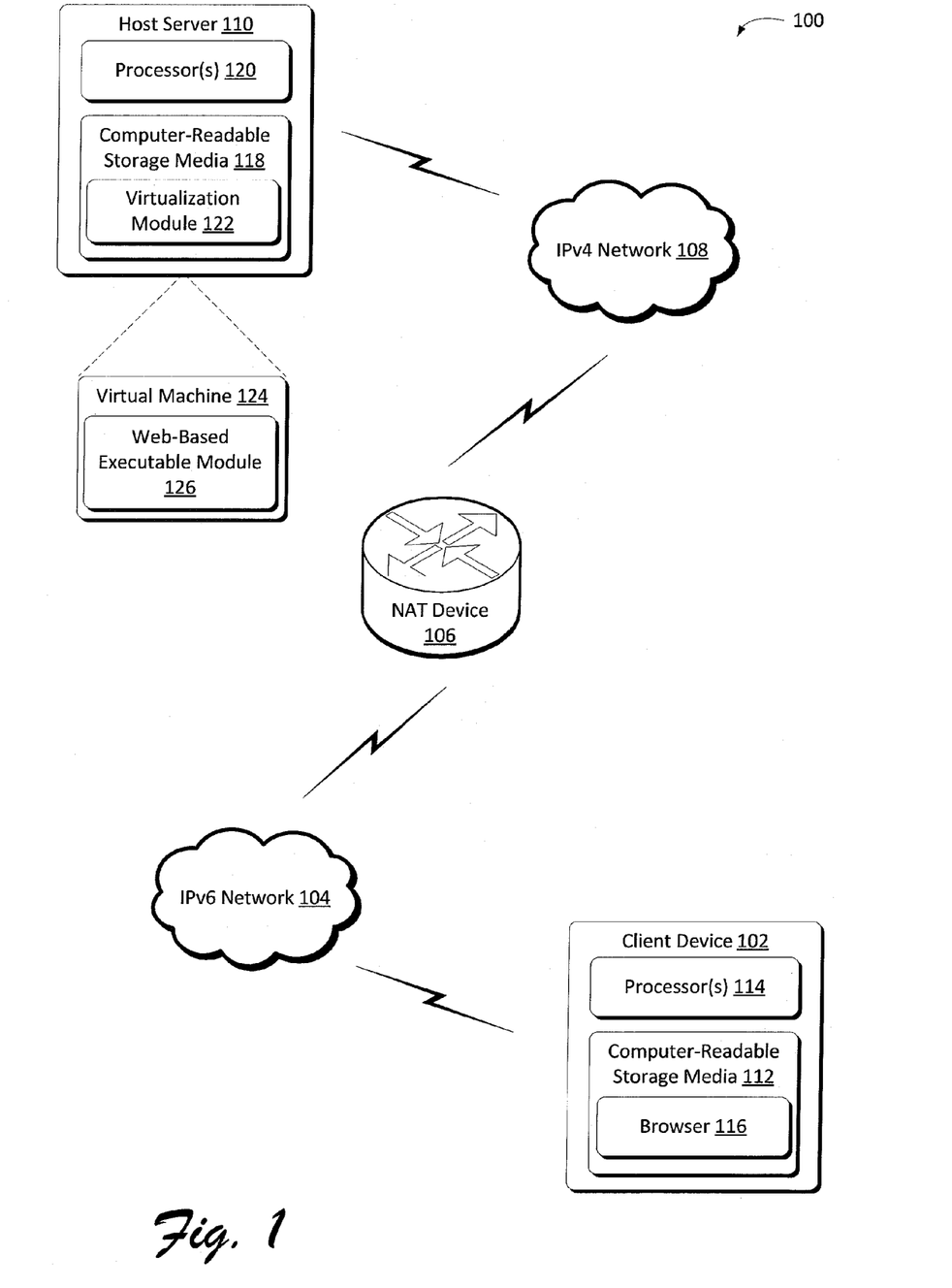
FIG. 1 illustrates an example operating environment in accordance with one or more embodiments.

FIG. 1 is an illustration of an example environment 100 in accordance with one or more embodiments. Environment 100 includes a client device 102 that is part of an IPv6 network 104. IPv6 network 104 is connected via a NAT device 106 to an IPv4 network 108. IPv4 network 108 includes at least host server 110.

Client device 102 includes computer-readable storage media 112 and at least one processor 114. A software executable module in the form of a browser 116 is embodied on computer-readable storage media 112 and, under the influence of processor 114, is configured to send information to, and receive information from, network devices, such as host server 110. For example, browser 116 can transmit a request for a web page or web-based application to host server 110 via networks 104 and 108. Client device 102 can be embodied as any suitable computing device such as, by way of example and not limitation, a desktop computer, a portable computer, a netbook, a handheld computer such as a personal digital assistant (PDA), cell phone, and the like.

Client device 102 is part of IPv6 network 104, and, like other devices that can be included in IPv6 network 104, it has a unique 128-bit IP address. As part of IPv6 network 104, client device 102 includes executable modules, such as an operating system and other applications with network capabilities, and hardware components that are IPv6-ready or are compatible with IPv6.

In various embodiments, a device on IPv6 network 104, such as client device 102, can transmit a data packet destined for a device on another network, such as host server 110 on IPv4 network 108. In such embodiments, NAT device 106 is configured to translate the data packet for transmission over the IPv4 network. The translation includes translation of the IP addresses of the source of the data packet and the destination for the data packet from IPv6 addresses into an IPv4 addresses. In various embodiments, NAT device 106 is configured to encapsulate the original IPv6 addresses for the destination into the data packet. This can be done in various ways, examples of which are provided above and below. Once the data packet includes a destination IP address in the form of an IPv4 address, the data packet can be transmitted via IPv4 network 108 to its destination.

In various embodiments, environment 100 includes more than one NAT device. When the state information is encapsulated in the data packet, the NAT device is not required to maintain a state table for translation between IPv6 and IPv4 addresses. Rather, because the information is included as part of the data packet itself, the NAT device can determine the appropriate translation of the address from the data packet. In various embodiments, each NAT device is configured to identify the encapsulated state information within the data packet and translate the address accordingly. When the NAT devices are configured in this way, a data packet transferred from an IPv6 network device (e.g., client device 102) to an IPv4 network device (e.g., virtual machine 124) need not pass through the same NAT device as the data packet including a response from the IPv4 network device to the IPv6 network device for proper translation. This can enable NAT devices to be deployed at geographically different locations and controlled using a centralized controller. Such an arrangement can, for example, enable an entry point for a network to differ from an exit point for the network. In various embodiments, inclusion of translation information in the data packet can enable loadbalancing and other advanced features to be implemented on NAT device 106.

Host server 110 includes computer-readable storage media 118 and at least one processor 120. Embodied on computer-readable storage media 118 is a virtualization module 122 that, under the influence of processor 120, is configured to create one or more virtual machines, such as virtual machine 124. Virtual machine 124 hosts, using the resources of host servers such as host server 110, a web-based executable module 126. For example, host server 110 can be a host computer for a web-based or cloud-based service, such as an email service or other web-based application. The web-based executable module 126 can be embodied on virtual machine 124. In various embodiments, virtual machine 124 can utilize the resources, such as memory and processors, of multiple host servers, such as servers that are part of a "server farm."

In various embodiments, host servers, such as host server 110, along with NAT devices, such as NAT device 106, are configured to send and receive jumbo packets or jumbo frames. A jumbo packet or jumbo frame is a packet with a frame size that is larger than typically supported in the environment. For example, assume devices within the environment, such as client device 102 and virtual machine 124, are configured to accept data packets with a maximum segment size (MSS) of 1460 bits. Data transmitted between the devices exceeding this MSS will be broken down and transmitted in a series of packets. Encapsulation of the state information into the data packet adds at least 128 bits to the packet, and can bring the size of a data packet that was originally less than the MSS over the 1460 bits allowed. Host servers and NAT devices can be enabled to receive jumbo packets with an MSS of 1500 bits or more via packet configuration settings within the devices. In various embodiments, host server 110 can remove the encapsulated information before transmitting the data packet to virtual machine 124 so that the data packet size has returned to its original size or fewer bits, and packet configuration of the virtual machine 124 does not need to be reconfigured.

When client device 102 transmits a data packet intended for virtual machine 124, such as a request for information from web-based executable module 126, the data packet is relayed from IPv6 network 104 to host server 110 on IPv4 network 108 via NAT device 106. Host server 110 can transmit the data packet to virtual machine 124. Any response transmitted by virtual machine 124 will pass through host server 110 and back to NAT device 106 for transmission to client device 102. As described above, in some embodiments, the original data packet transmitted from client device 102 can pass through a different NAT device than the NAT device through which the response from virtual machine 124 passes.

The computer-readable storage media included in each device or server can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 7.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer-readable memory devices. The features of the user interface techniques described below are platform-independent, meaning that the techniques may be implemented on a variety of commercial computing platforms having a variety of processors.

Having described an exemplary operating environment, consider the following description of translation of network addresses including encapsulating state information into the data packet being transferred.

Example Embodiments

Figure 2:
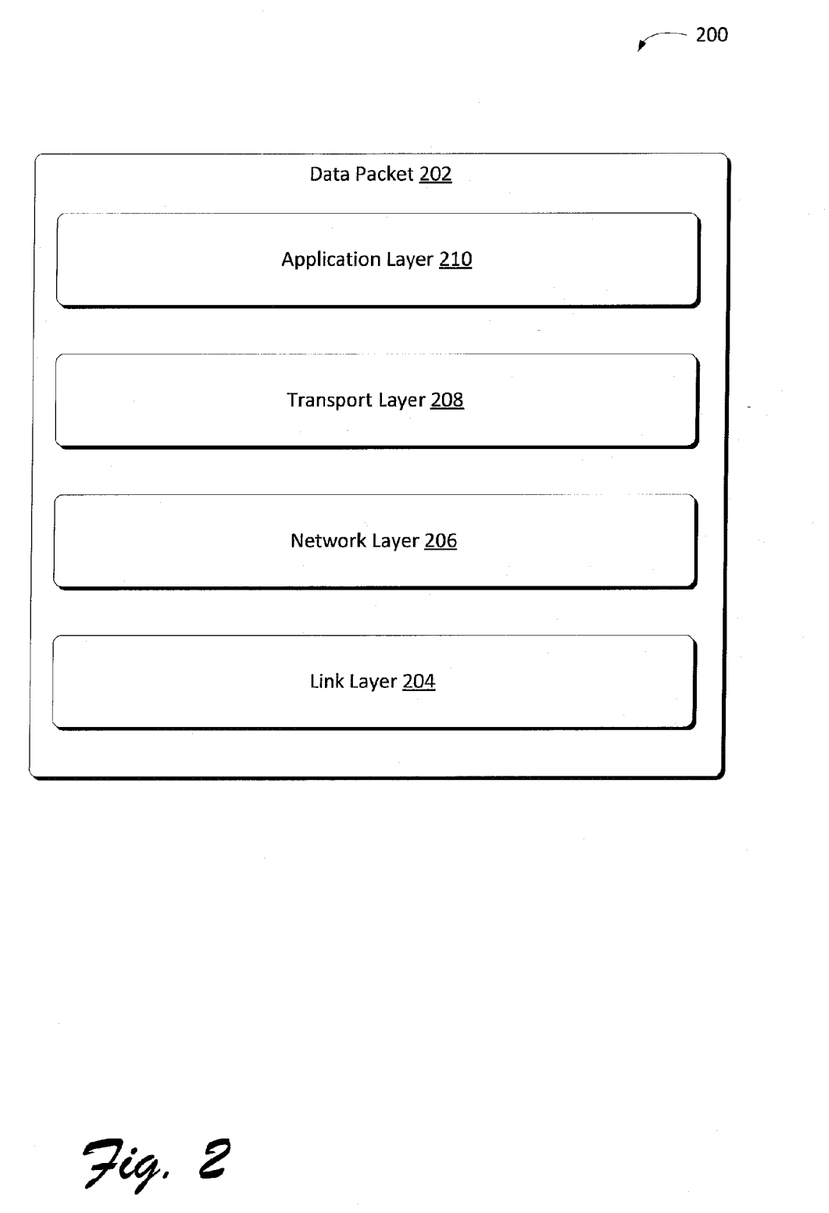
FIG. 2 is a block diagram of a data packet in accordance with one or more embodiments.

FIG. 2 depicts an example data packet in accordance with one or more embodiments. In particular, FIG. 2 illustrates an open systems interconnection (OSI) model 200 of a data packet 202. The model describes a set of implementations of networking protocols to enable various devices to communicate over a network. Data packet 202 is shown including four layers: link layer 204, network layer 206, transport layer 208, and application layer 210. In various embodiments, application layer 210 can include additional layers which have been condensed herein for simplicity.

Link layer 204 provides the functional and procedural means to transfer data between network entities and to detect and possibly correct errors that may occur in the physical layer. Transmitting and receiving packets on a link can be controlled via a software device driver for a network card, firmware or specialized chipsets. These components can perform data link functions, such as adding a packet header and transmitting the frame over a physical medium, such as via a network hub.

Network layer 206 transmits packets across one or more networks by performing at least two basic functions: host addressing and identification and packet routing. The network layer 206 can include data utilized by various upper layer protocols, such as transmission control protocol (TCP) and user datagram protocol (UDP), for example. The TCP header can also include an IP options field, in addition to other fields, that can be used to provide information for components involved in the IP transmission of the data packet 202. In various embodiments, state information for use in translating the IP addresses for the data packet between IPv6 and IPv4 formats can be encapsulated in the data packet 202 by including it in the IP options field. In various embodiments, network layer 206 includes an IP header that includes a source IP address and a destination IP address for the data packet.

Transport layer 208 can provide end-to-end message transfer capabilities independent of the underlying network, in addition to providing error control, segmentation, flow control, and application addressing functionality. End-to-end message transmission can be connection-oriented (such as implemented in TCP) or connectionless (such as implemented in UDP). Transport layer 208 can connect applications via service ports and provide reliability to the TCP/IP stack.

Application layer 210 represents the highest-level protocols used by most applications for network communication. Application layer 210 provides the functional and procedural means to transfer data between network entities and to detect and possibly correct errors that may occur in the physical layer, and can include a session layer and a presentation layer, in some embodiments. Application layer 210 can provide interhost communication, manage sessions between applications, encryption and decryption functionality, and can convert machine dependent data to machine independent data.

Figure 3:
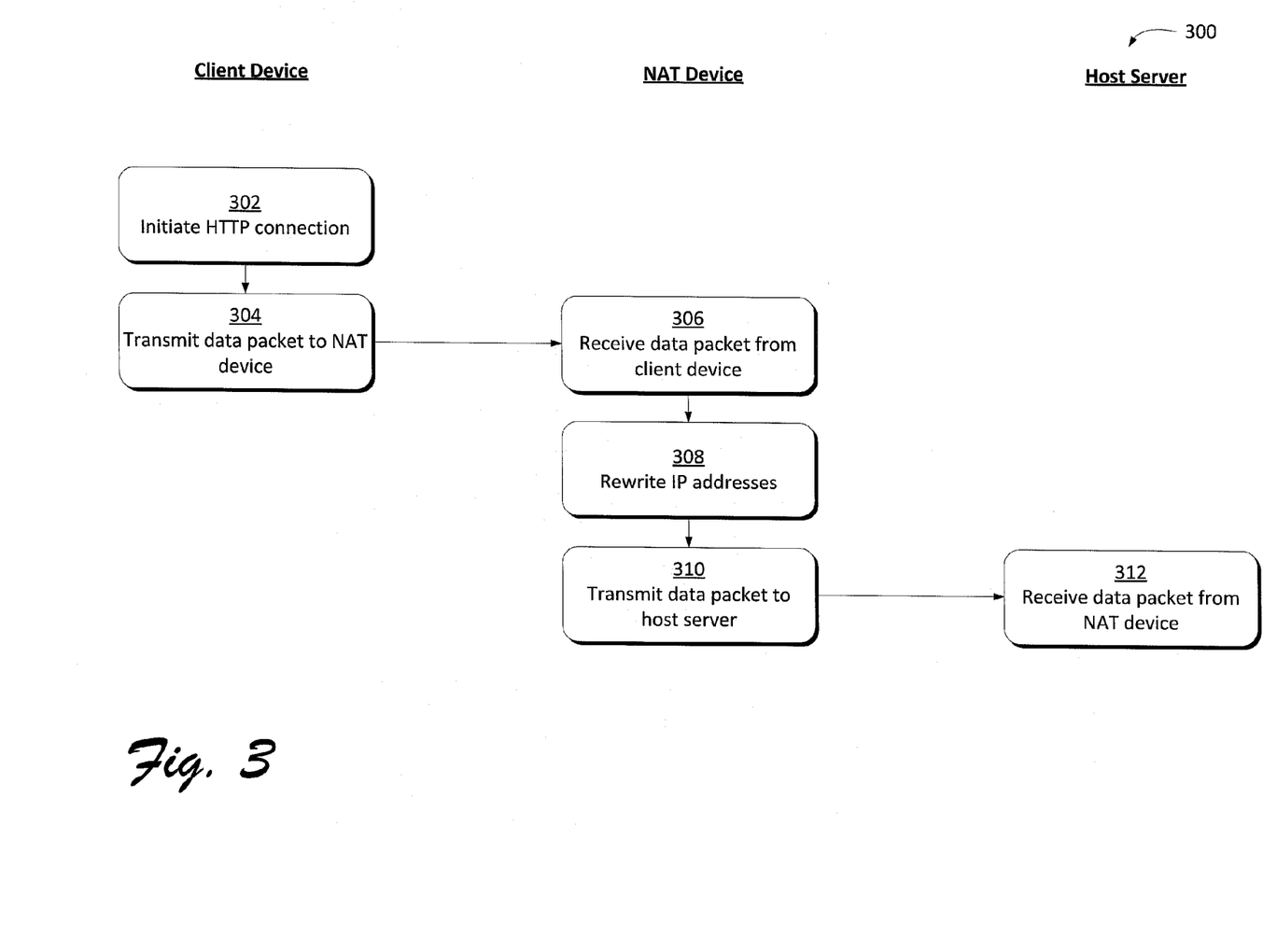
FIG. 3 is a flow diagram of an example process for transmitting a data packet from a client device to a host server in accordance with one or more embodiments.

FIG. 3 is an example process 300 for transmitting a data packet from a client device to a host server in accordance with one or more embodiments. The process can be implemented in connection with any suitable hardware, software, firmware, or combination thereof. In at least some embodiments, the process can be implemented in software. In FIG. 3, various steps in the process are indicated as being performed by a "Client Device," a "NAT Device," or a "Host Server."

Block 302 initiates a hypertext transfer protocol (HTTP) connection. This can be performed in any suitable way. For example, a user can enter a domain name or uniform resource locator (URL) into an address bar of browser 116 on client device 102.

Block 304 transmits a data packet to a NAT device. The data packet includes an IPv6 address corresponding to the client device as its source address and an IPv6 address corresponding to the destination of the packet as its destination address. This can be performed in any suitable way. For example, browser 116 can transmit a request for information from a web-based service, such as web-based executable module 126 on virtual machine 124. The data packet can include an IPv6 address for client device 102 as its source address and can include an IPv6 address for virtual machine 124 as its destination address. Because virtual machine 124 operates on IPv4 network 108, the data packet first passes to NAT device 106 for translation.

Block 306 receives the data packet from the client device. This can be performed in any suitable way. For example, NAT device 106 can receive the data packet via IPv6 network 104.

Block 308 rewrites the IP addresses. This can be performed in any suitable way. For example, NAT device 106 can translate the IPv6 addresses for client device 102 and virtual machine 124 into IPv4 addresses and insert these IPv4 addresses into the IP header as the source and destination addresses for the data packet. In various embodiments, the original IPv6 addresses are encapsulated into the data packet. This can be performed in any suitable way. For example, in some embodiments, the state information required to translate the network addresses between IPv6 and IPv4 can be inserted into an "IP Options" field that is part of the TCP header. The state information can be encapsulated in other areas or according to other methods depending on the particular embodiment, provided both the NAT device and host server are configured to identify the state information within the data packet.

Block 310 transmits the data packet to the host server. This can be performed in any suitable way. For example, NAT device 106 can transmit the data packet to host server 110 via IPv4 network 108. Finally, block 312 receives the data packet from the NAT device. This can be performed in any suitable way.

In some embodiments, the host server can be the ultimate destination for the data packet. For example, the host server can be a web page hosting server and the data packet can be a request for a web page. In such embodiments, the data packet has reached its destination when it is received by the host server at block 312. However, in other embodiments, the data packet has a destination accessible via the host server. For example, when browser 116 transmits a request for information from a web-based service, such as web-based executable module 126 on virtual machine 124, the data packet passes through host server 110 which transmits the data packet to virtual machine 124.

Figure 4:
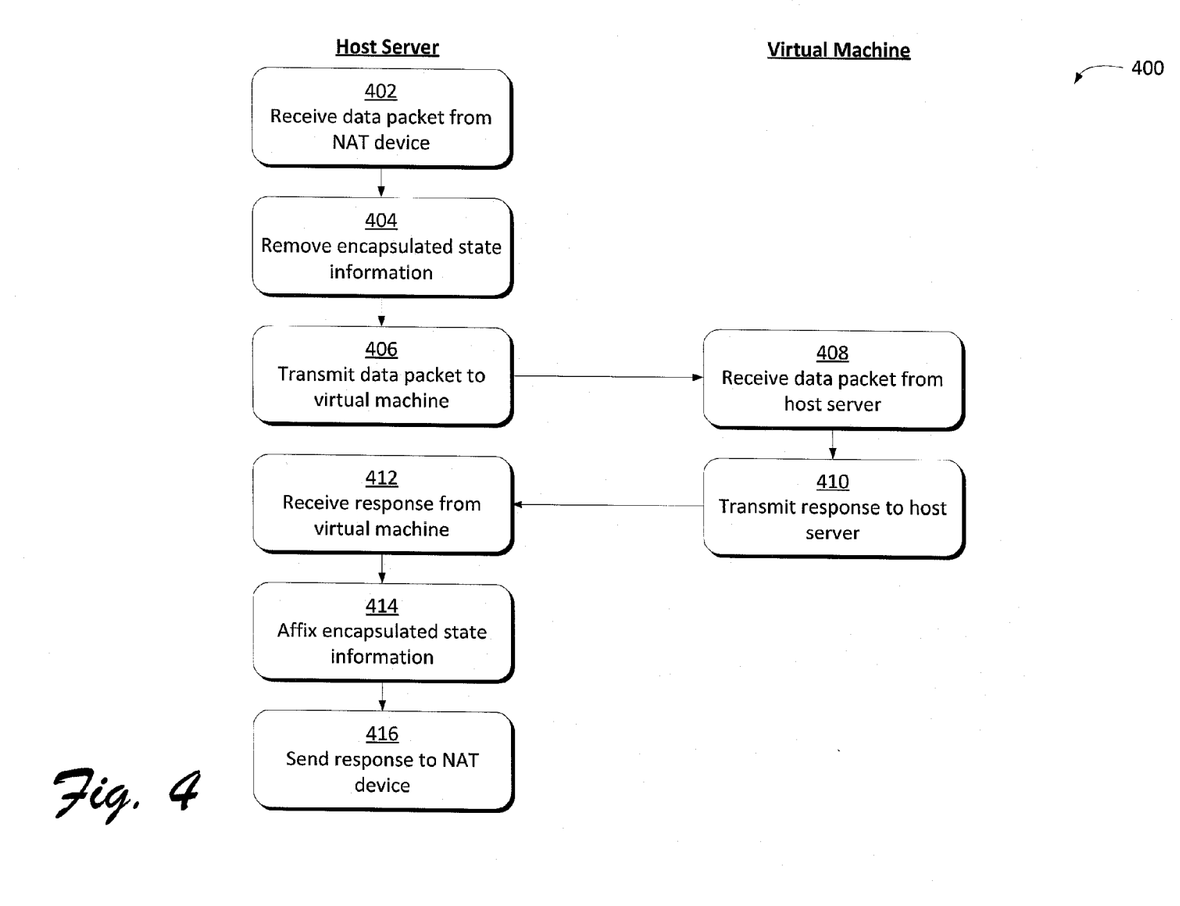
FIG. 4 is a flow diagram of an example process for transmitting a data packet from a host server to a client device in accordance with one or more embodiments.

FIG. 4 is an example process 400 for transmitting a data packet from a host server to a virtual machine in accordance with one or more embodiments. The process can be implemented in connection with any suitable hardware, software, firmware, or combination thereof. In at least some embodiments, the process can be implemented in software. In FIG. 4, various steps in the process are indicated as being performed by a "Host Server" or a "Virtual Machine"

Block 402 receives a data packet from a NAT device. This can be performed in any suitable way. For example, host server 110 can receive a data packet from NAT device 106 via IPv4 network 108. In various embodiments, the data packet includes encapsulated state information, as described above and below.

Next, block 404 removes the encapsulated state information. This can be performed in any suitable way. For example, host server 110, configured to identify the encapsulated state information within the data packet, can remove the state information from its location in the data packet. For example, if the state information is encapsulated in the data packet by having been inserted into the IP options field in the TCP header, host server 110 can remove the state information from the IP options field. In various embodiments, host server 110 also removes the top layer of the data packet.

Block 406 transmits the data packet to a virtual machine. This can be performed in any suitable way. For example, host server 110 can transmit the data packet to virtual machine 124 as indicated by the destination IP address in the data packet header.

Block 408 receives the data, packet from the host server. This can be performed in any suitable way. For example, virtual machine 124 can receive the data packet from host server 110. In various embodiments, when the virtual machine receives the data packet, it processes the data packet and responds accordingly. For example, in some embodiments, the data packet will include a request for a response indicating that the data packet was received. In other embodiments, the data packet includes a request for a web page or other information from the virtual machine. In such embodiments, the response can include such information requested in the original data packet.

Block 410 transmits a response to the host server. This can be performed in any suitable way. For example, virtual machine 124 can transmit a response in the form of another data packet to host server 110. This new data packet which includes the response includes the IPv4 address of the virtual machine as well as the IPv4 address for the client device 102. Virtual machine 124 obtains the IPv4 address for the client device 102 from the "source address" of the original data packet.

Block 412 receives the response from the virtual machine. This can be performed in any suitable way. For example, host server 110 can receive the data packet including the response from virtual machine 124.

Block 414 affixes encapsulated state information to the data packet. This can be performed in any suitable way. For example, host server 110 can affix the encapsulated state information by including the state information in the IP options field of the TCP header when it affixes an outer layer to the data packet for transmission. The encapsulated state information can be affixed in other locations depending on the particular embodiment.

Finally, block 416 transmits the response to a NAT device. This can be performed in any suitable way. For example, host server 110 can transmit the response to NAT device 106 via IPv4 network 108. In various embodiments, the NAT device to which the host server transmits the response can be the same or a different NAT device from which the original data packet was received.

Having transmitted the original data packet to its ultimate destination (e.g., either a virtual machine or a host server, depending on the particular embodiment), in various embodiments, a response is transmitted back to the client device. In embodiments in which a virtual machine transmits a response, the response is transmitted back to the client device after passing through the host server. The path of data transmission of the response is therefore the same from the point of the host server on to the client device regardless of whether the host server or the virtual machine has generated the response.

Figure 5:
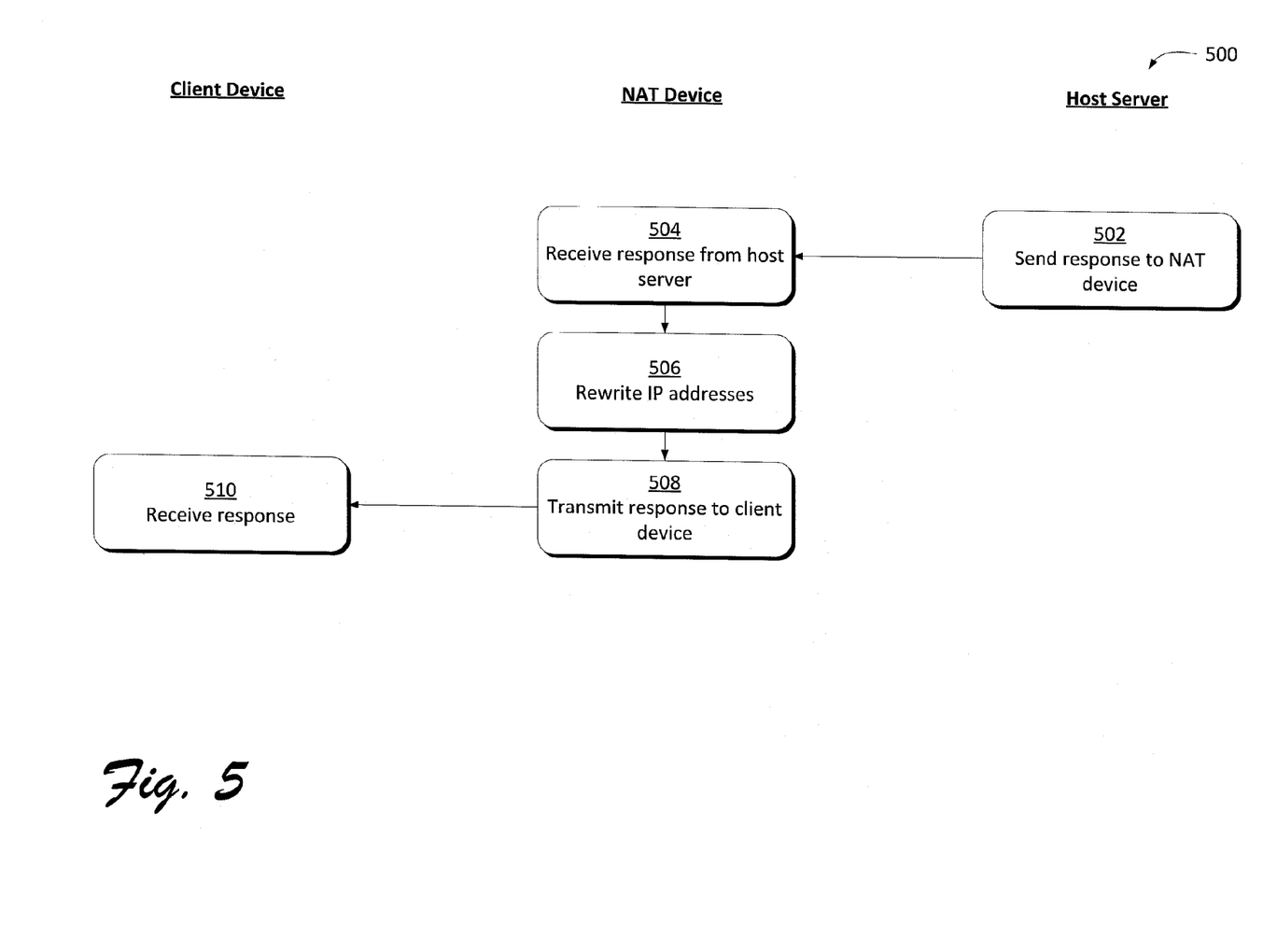
FIG. 5 is a flow diagram of an example process for transmitting a data packet from a host server to a client device in accordance with one or more embodiments.

FIG. 5 is an example process 500 for transmitting a data packet including a response from a host server to a client device in accordance with one or more embodiments. The process can be implemented in connection with any suitable hardware, software, firmware, or combination thereof. In at least some embodiments, the process can be implemented in software. In FIG. 5, various steps in the process are indicated as being performed by a "Client Device," a "NAT Device," or a "Host Server."

Block 502 sends a response to a NAT device. This can be performed in any suitable way. For example, host server 110 can transmit a response to NAT device 106 via IPv4 network 108. In some embodiments, the response was received from a virtual machine, while in other embodiments, the response was generated by host server 110 because the host server was the destination of the original data packet. The response includes encapsulated state information, as described above and below.

Block 504 receives a response from a host server. This can be performed in any suitable way. For example, NAT device 106 receives the response from host server 110.

Next, block 506 rewrites the IP addresses. This can be performed in any suitable way. For example, NAT device 106 can extract the state information that was encapsulated within the data packet and translate the source and destination IP addresses from IPv4 addresses to IPv6 addresses. When translated into IPv6 addresses, the IP addresses for the response match the IP addresses included in the data packet transmitted by block 304 in FIG. 3, with the exception that the source address in the response was the destination address in the data packet transmitted by block 304 and the destination address in the response was the source address in the data packet transmitted by block 304. NAT device 106 also removes the encapsulated state information and returns the data packet to its original size.

Block 508 transmits the response to the client device. This can be performed in any suitable way. For example, NAT device 106 can transmit the response to client device 102 via IPv6 network 104. Block 510 receives the response. This can be performed in any suitable way. For example, client device 102 receives the response from NAT device 106.

Because the IP addresses were translated utilizing the same state information for the data packets from the client device to the virtual machine and from the virtual machine to the client device, when the client device receives the response, the response indicates that the source of the response is the virtual machine to which the client device transmitted the data packet. In other words, the IPv6 address assigned to the virtual machine is the same for the response as it is for the original data packet. This enables the client device to send information to and receive information from the virtual machine via stateful communications without awareness that the virtual machine operates on an IPv4 network. Similarly, the virtual machine can communicate with client devices operating on an IPv6 network though it may only be configured for communication via an IPv4 network.

Figure 6:
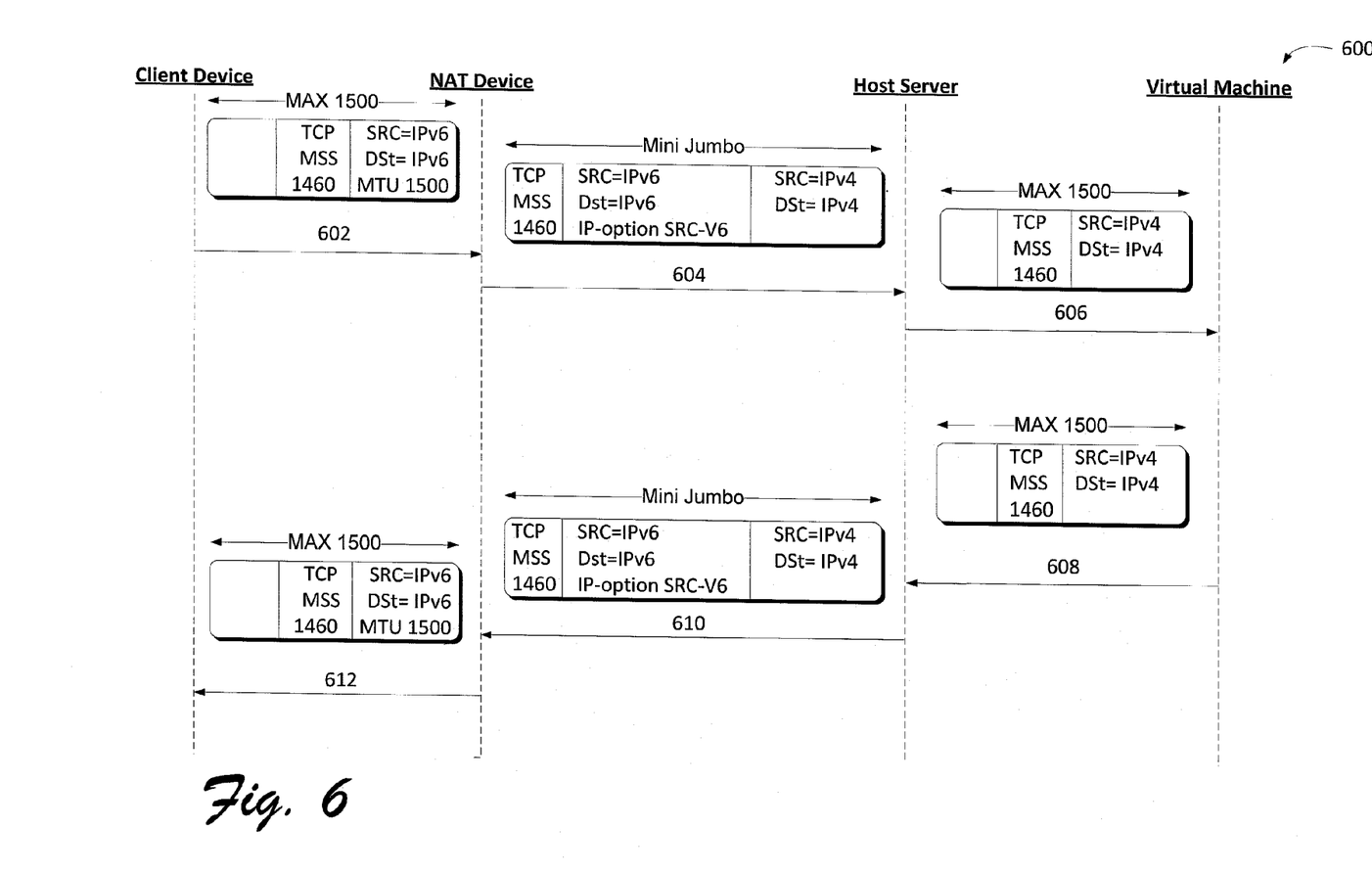
FIG. 6 is a diagram of an example transmission path for a data packet in accordance with one or more embodiments.

FIG. 6 illustrates a transmission path 600 for a data packet and response in accordance with one or more embodiments. In FIG. 6, various steps in the path are indicated as being performed by a "Client Device," a "NAT Device," a "Host Server," or a "Virtual Machine."

At transfer 602, the data packet is transferred from a client device to a NAT device. The IP header of the data packet includes a source address and a destination address in IPv6 format.

Upon receipt of the data packet by the NAT device, the NAT device translates the IPv6 addresses and encapsulates the state information in the data packet, as described above and below. At transfer 604, the data packet is transferred from the NAT device to a host server. The IP header of the data packet now includes a source address and a destination address in IPv4 format, and the TCP header includes encapsulated state information. The state information can include the source IP address and destination IP address in IPv6 format. Other information can be included, depending on the particular embodiment. In various examples, the state information is included in the IP options field of the TCP header, although it can be encapsulated in other locations in the data packet.

The data packet at transfer 604 is annotated "mini jumbo" to represent its slightly larger-than-normal size. Because it can be larger than a standard packet size, the NAT device and host server can be configured to send and receive larger packets. Such configurations can be adjusted in the packet configuration settings of these devices.

The host server receives the data packet and can remove the IP header and/or clear the IP options field. Thus, at transfer 606, the data packet is returned to its normal size and is no longer a "mini jumbo" packet. Furthermore, the IP address for both the source and destination of the packet remain in IPv4 format. Transfer 606 transmits the data packet from the host server to the virtual machine.

Transfer 608 represents the transfer of a response from the virtual machine as it is transferred to the host server. The data packet includes a source and destination address in IPv4 format.

The data packet is received by the host server, which affixes the IP header and/or reinserts the state information into the IP options field. The data packet can again be referred to as a "mini jumbo" packet, as it includes encapsulated information that makes it larger than standard size. At transfer 610, the data packet is transferred from the host server to a NAT device. As described above, the NAT device can be the same NAT device that transmitted the data packet to the host server at transfer 604 or it can be a different NAT device. Since the state information is encapsulated within the data packet, any NAT device configured to understand the encapsulation can correctly translate the IP addresses back into IPv6 format.

The NAT device translates the IP addresses into IPv4 format using the state information and removes the state information from the data packet, returning it to a standard size. At transfer 612, the data packet, which includes source and destination IP addresses in IPv6 format, is transmitted from the NAT device to the client device. The source IP address of the data packet at transfer 612 matches the destination IP address of the data packet at transfer 602, indicating to the client device that a response has been received from the virtual machine.

Having described various embodiments for encapsulating state information for translation of network addresses, consider a device that can be used to implement one or more embodiments.

Example Device

Figure 7:
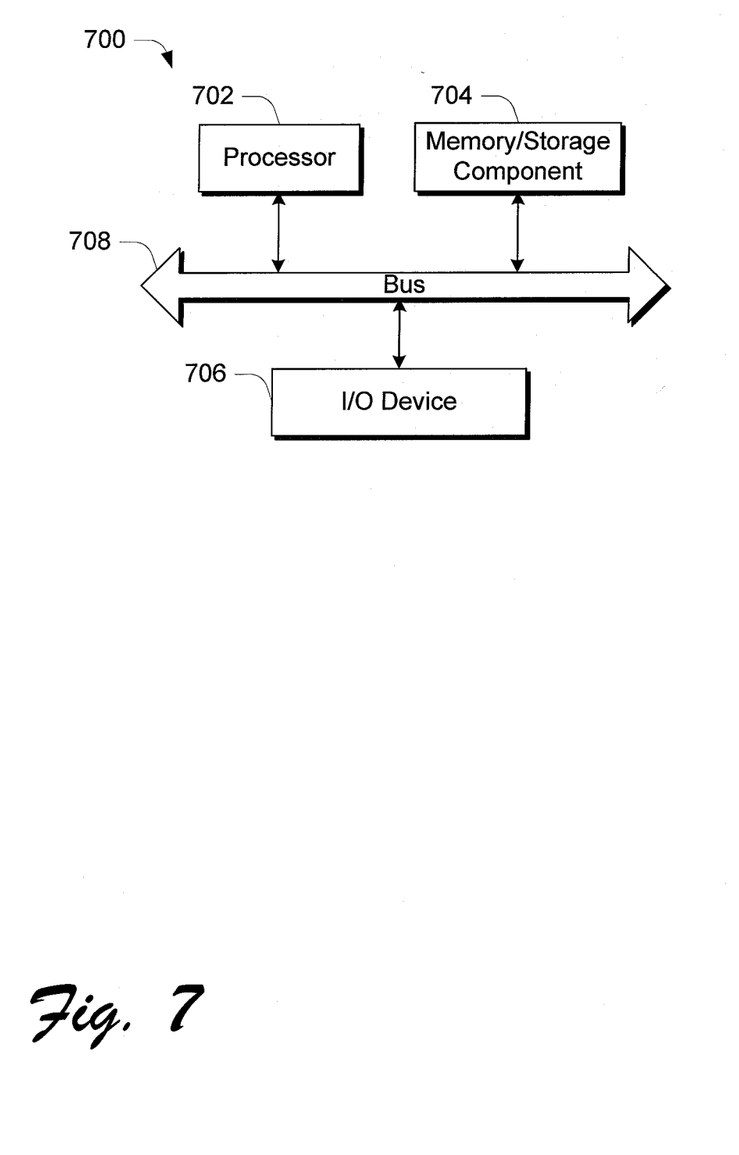
FIG. 7 is a block diagram of an example device that can be used to implement one or more embodiments.

FIG. 7 illustrates an example computing device 700 that can be used to implement the various embodiments described above. Computing device 700 can be, for example, host server 110 or NAT device 106 of FIG. 1 or any other suitable computing device.

Computing device 700 includes one or more processors or processing units 702, one or more memory and/or storage components 704, one or more input/output (I/O) devices 706, and a bus 708 that allows the various components and devices to communicate with one another. Bus 708 represents one or more of any of several types of bus structures, including a memory bus or memory controller, a peripheral bus, an accelerated graphics port, and a processor or local bus using any of a variety of bus architectures. Bus 708 can include wired and/or wireless buses.

Memory/storage component 704 represents one or more computer storage media. Memory/storage component 704 can include volatile media (such as random access memory (RAM)) and/or nonvolatile media (such as read only memory (ROM), flash memory, optical disks, magnetic disks, and so forth). Component 704 can include fixed media (e.g., RAM, ROM, a fixed hard drive, etc.) as well as removable media (e.g., a flash memory drive, a removable hard drive, an optical disk, and so forth).

One or more input/output devices 706 allow a user to enter commands and information to computing device 700, and also allow information to be presented to the user and/or other components or devices. Examples of input devices include a keyboard, a cursor control device (e.g., a mouse), a microphone, a scanner, devices configured to receive gesture, touch or voice input, and so forth. Examples of output devices include a display device (e.g., a monitor or projector), speakers, a printer, a network card, and so forth.

As before, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer-readable storage devices. The features of the techniques described above are platform-independent, meaning that the techniques may be implemented on a variety of commercial computing platforms having a variety of processors.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media."

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

While various embodiments have been described above, it should be understood that they have been presented by way of example, and not limitation. It will be apparent to persons skilled in the relevant art(s) that various changes in form and detail can be made therein without departing from the scope of the present disclosure. Thus, embodiments should not be limited by any of the above-described exemplary embodiments, but should be defined only in accordance with the following claims and their equivalents.

What is claimed is:

1. One or more computer-readable storage memory devices comprising instructions that are executable to cause a device to perform a process comprising:
   receiving a data packet including a source address and a destination address in an IPv6 format;
   translating the source address and the destination address to an IPv4 format according to state information; and
   encapsulating the state information in a TCP Header of the data packet.

2. The one or more computer-readable storage memory devices of claim 1, encapsulating the state information in the TCP header comprising encapsulating the state information in an IP options field in the TCP header.

3. The one or more computer-readable storage memory devices of claim 1, the process further comprising:
   receiving the data packet via an IPv6 network.

4. The one or more computer-readable storage memory devices of claim 1, the process further comprising:
   transmitting the data packet including encapsulated state information.

5. The one or more computer-readable storage memory devices of claim 4, the transmitting the data packet comprising transmitting the data packet via an IPv4 network.

6. The one or more computer-readable storage memory devices of claim 1, wherein the translating further comprises increasing a Maximum Segment Size (MSS) of the data packet in the IPv4 format.

7. The one or more computer-readable storage memory devices of claim 6, wherein the increased MSS increases the size of the data packet in the IPv4 format to accommodate the encapsulated state information.

8. A device comprising:
   one or more processors;
   one or more computer-readable storage media;
   one or more modules embodied on the one or more computer-readable storage media and executable under the influence of the one or more processors, the one or more modules configured to:
      receive a data packet including a source address and a destination address in a first format according to an IPv6 protocol;
      translate the source address and the destination address to a second format according to an IPv4 protocol using state information; and
      encapsulate the state information in a TCP header of the data packet.

9. The device of claim 8, the one or more modules further configured to:
   transmit the data packet including encapsulated state information over a network operated according to the IPv4 protocol.

10. The device of claim 8, the one or more modules configured to receive the data packet comprising the one or more modules configured to receive the data packet via a first network operated according to the first IPv6 protocol.

11. The device of claim 10, the one or more modules further configured to:
    transmit the data packet including encapsulated state information over a second network operated according to the IPv4 protocol.

12. The device of claim 8, the one or more modules further configured to:
    receive a response including a source address and a destination address in the second format according to the IPv4 protocol; and
    translate the source address and the destination address of the response to the first format according the IPv6 protocol using state information encapsulated in the response.

13. The device of claim 8, the encapsulation of the state information in the TCP header comprises encapsulating the state information in an IP options field in the TCP header.

14. The device of claim 8, wherein the translation further comprises increasing a Maximum Segment Size (MSS) of the data packet in the IPv4 format.

15. The device of claim 14, wherein the increased MSS increases the size of the data packet in the IPv4 format to accommodate the encapsulated state information.

16. A computer implemented method comprising:
    receiving a data packet including a source address and a destination address in an IPv6 format;
    translating the source address and the destination address to an IPv4 format according to state information; and
    encapsulating the state information in a TCP Header of the data packet.

17. The computer implemented method of claim 16, encapsulating the state information comprising encapsulating the state information in an IP options field in the TCP header.

18. The computer implemented method of claim 16 further comprising:
    receiving the data packet via an IPv6 network.

19. The computer implemented method of claim 16 further comprising:
    transmitting the data packet including encapsulated state information.

20. The computer implemented method of claim 19, the transmitting the data packet comprising transmitting the data packet via an IPv4 network.

21. The computer implemented method of claim 16, wherein the translating further comprises increasing a Maximum Segment Size (MSS) of the data packet in the IPv4 format.

22. The computer implemented method of claim 21, wherein the increased MSS increases the size of the data packet in the IPv4 format to accommodate the encapsulated state information.

* * * * *